(12) United States Patent
Deniau et al.

(10) Patent No.: US 9,446,636 B2
(45) Date of Patent: Sep. 20, 2016

(54) PRESSURE CHECK TOOL AND METHOD OF OPERATING THE SAME

(71) Applicant: Continental Automotive Systems, Inc., Auburn Hills, MI (US)

(72) Inventors: Jean-Christophe Deniau, Fenton, MI (US); Steven Landis, Kutztown, PA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1 day.

(21) Appl. No.: 14/190,950

(22) Filed: Feb. 26, 2014

(65) Prior Publication Data

US 2015/0239305 A1 Aug. 27, 2015

(51) Int. Cl.
| | |
|---|---|
| *B60C 23/00* | (2006.01) |
| *B60R 25/10* | (2013.01) |
| *B60C 23/02* | (2006.01) |
| *G01M 3/08* | (2006.01) |
| *G01M 17/02* | (2006.01) |
| *B60C 23/04* | (2006.01) |

(52) U.S. Cl.
CPC ....... *B60C 23/0479* (2013.01); *B60C 23/0462* (2013.01); *B60C 23/0471* (2013.01)

(58) Field of Classification Search
CPC ... B60C 23/04; B60C 23/00; B60C 23/0408; B60C 23/0403; B60C 23/0496; G01M 3/2876; G01M 17/022
USPC .......... 340/445, 447, 442, 426.33; 116/34 R, 116/34 A; 73/48, 146–146.8
See application file for complete search history.

(56) References Cited

U.S. PATENT DOCUMENTS

| | | |
|---|---|---|
| 2,428,089 A | 9/1947 | Mumma et al. |
| 2,451,859 A | 10/1948 | Mumma et al. |
| 3,777,062 A | 12/1973 | Ogawa |
| 3,814,839 A | 6/1974 | Lubarsky et al. |
| 3,814,840 A | 6/1974 | Lubarsky et al. |
| 4,589,063 A | 5/1986 | Shah et al. |
| 4,703,359 A | 10/1987 | Rumbolt |
| 4,734,674 A | 3/1988 | Thomas et al. |
| 4,737,761 A | 4/1988 | Dosjoub et al. |

(Continued)

FOREIGN PATENT DOCUMENTS

| | | |
|---|---|---|
| CN | 1521027 A | 8/2004 |
| CN | 103503353 A | 1/2014 |

(Continued)

OTHER PUBLICATIONS

International Search Report and Written Opinion dated Apr. 30, 2015 from corresponding International Patent Application No. PCT/US2015/016174.

(Continued)

*Primary Examiner* — Andrew Bee
*Assistant Examiner* — Munear Akki (57) ABSTRACT

At a portable tool, vehicle identification information is requested from a vehicle and responsively received from the vehicle. Based upon the vehicle information, one or more tire pressure sensor activation/trigger methods or parameters are determined. The determined one or more tire pressure sensor activation/trigger methods or parameters are used to activate singularly or a plurality of tire pressure monitoring (TPM) sensors at the vehicle. Tire pressure information is responsively received from the activated TPM sensors.

15 Claims, 3 Drawing Sheets

(56) References Cited

U.S. PATENT DOCUMENTS

| | | |
|---|---|---|
| 4,742,857 A | 5/1988 | Gandhi |
| 4,774,511 A | 9/1988 | Rumbolt et al. |
| 4,924,210 A | 5/1990 | Matsui et al. |
| 4,959,810 A | 9/1990 | Darbee |
| 4,999,622 A | 3/1991 | Amano et al. |
| 5,061,917 A | 10/1991 | Higgs et al. |
| 5,196,682 A | 3/1993 | Englehardt |
| 5,201,067 A | 4/1993 | Grube |
| 5,223,844 A | 6/1993 | Mansel |
| 5,228,077 A | 7/1993 | Darbee |
| 5,231,872 A | 8/1993 | Bowler et al. |
| 5,243,430 A | 9/1993 | Emmons |
| 5,255,313 A | 10/1993 | Darbee |
| 5,303,259 A | 4/1994 | Loveall |
| 5,335,540 A | 8/1994 | Bowler et al. |
| 5,365,225 A | 11/1994 | Bachhuber |
| 5,414,761 A | 5/1995 | Darbee |
| 5,434,572 A | 7/1995 | Smith |
| 5,455,570 A | 10/1995 | Cook |
| 5,515,052 A | 5/1996 | Darbee |
| 5,537,463 A | 7/1996 | Escobosa |
| 5,540,092 A | 7/1996 | Handfield et al. |
| 5,552,917 A | 9/1996 | Darbee |
| 5,562,787 A | 10/1996 | Koch et al. |
| 5,564,101 A | 10/1996 | Eisfeld et al. |
| 5,581,023 A | 12/1996 | Handfield et al. |
| 5,585,554 A | 12/1996 | Handfield et al. |
| 5,600,301 A | 2/1997 | Robinson, III |
| 5,602,524 A | 2/1997 | Mock et al. |
| 5,614,906 A | 3/1997 | Hayes |
| 5,624,265 A | 4/1997 | Redford |
| 5,661,651 A | 8/1997 | Geschke et al. |
| 5,663,496 A | 9/1997 | Handfield et al. |
| 5,698,353 A | 12/1997 | Jeong |
| 5,706,247 A | 1/1998 | Merritt et al. |
| 5,731,516 A | 3/1998 | Handfield et al. |
| 5,731,763 A | 3/1998 | Herweck |
| 5,732,283 A | 3/1998 | Rose et al. |
| 5,741,966 A | 4/1998 | Handfield et al. |
| 5,768,499 A | 6/1998 | Treadway et al. |
| 5,808,558 A | 9/1998 | Meek et al. |
| 5,838,229 A | 11/1998 | Robinson, III |
| 5,841,390 A | 11/1998 | Tsui |
| 5,844,131 A | 12/1998 | Gabelmann et al. |
| 5,880,363 A | 3/1999 | Meyer et al. |
| 5,883,305 A | 3/1999 | Jo et al. |
| 5,900,808 A | 5/1999 | Lebo |
| 5,926,087 A | 7/1999 | Busch et al. |
| 5,959,751 A | 9/1999 | Darbee |
| 5,963,128 A | 10/1999 | McClelland |
| 5,965,808 A | 10/1999 | Normann et al. |
| 6,002,450 A | 12/1999 | Darbee |
| 6,005,486 A | 12/1999 | Fridley |
| 6,011,463 A | 1/2000 | Cormier, Sr. |
| 6,014,092 A | 1/2000 | Darbee |
| 6,018,993 A | 2/2000 | Normann et al. |
| 6,021,319 A | 2/2000 | Tigwell |
| 6,034,597 A | 3/2000 | Normann et al. |
| 6,078,270 A | 6/2000 | Shim |
| 6,087,930 A | 7/2000 | Kulka et al. |
| 6,112,165 A | 8/2000 | Uhl et al. |
| 6,124,786 A | 9/2000 | Normann et al. |
| 6,141,792 A | 10/2000 | Acker et al. |
| 6,154,658 A | 11/2000 | Casi |
| 6,155,119 A | 12/2000 | Normann et al. |
| 6,169,480 B1 | 1/2001 | Uhl et al. |
| 6,169,907 B1 | 1/2001 | Chang et al. |
| 6,181,241 B1 | 1/2001 | Normann et al. |
| 6,192,747 B1 | 2/2001 | Fennel |
| 6,194,999 B1 | 2/2001 | Uhl et al. |
| 6,201,819 B1 | 3/2001 | Luders |
| 6,204,758 B1 | 3/2001 | Wacker et al. |
| 6,208,341 B1 | 3/2001 | van Ee et al. |
| 6,218,936 B1 | 4/2001 | Imao |
| 6,259,361 B1 | 7/2001 | Robillard et al. |
| 6,271,748 B1 | 8/2001 | Derbyshire et al. |
| 6,275,148 B1 | 8/2001 | Takamura et al. |
| 6,297,731 B1 | 10/2001 | Flick |
| 6,298,095 B1 | 10/2001 | Kronestedt et al. |
| 6,333,698 B1 | 12/2001 | Roddy |
| 6,362,731 B1 | 3/2002 | Lill |
| 6,369,703 B1 | 4/2002 | Lill |
| 6,396,408 B2 | 5/2002 | Drummond et al. |
| 6,400,263 B1 | 6/2002 | Kokubo |
| 6,408,232 B1 | 6/2002 | Cannon et al. |
| 6,438,467 B1 | 8/2002 | Pacsai |
| 6,441,728 B1 | 8/2002 | Dixit et al. |
| 6,445,286 B1 | 9/2002 | Kessler et al. |
| 6,446,502 B1 | 9/2002 | Normann et al. |
| 6,453,737 B2 | 9/2002 | Young et al. |
| 6,463,798 B2 | 10/2002 | Niekirk et al. |
| 6,469,621 B1 | 10/2002 | Vredevogd et al. |
| 6,477,165 B1 | 11/2002 | Kosco |
| 6,486,773 B1 | 11/2002 | Bailie et al. |
| 6,489,888 B1 | 12/2002 | Honeck et al. |
| 6,490,452 B1 | 12/2002 | Boscovic et al. |
| 6,507,306 B1 | 1/2003 | Griesau |
| 6,518,891 B2 | 2/2003 | Tsutsui et al. |
| 6,567,032 B1 | 5/2003 | Mullaly |
| 6,571,617 B2 | 6/2003 | Van Niekerk et al. |
| 6,612,165 B2 | 9/2003 | Juzswik et al. |
| 6,622,552 B1 | 9/2003 | Delaporte |
| 6,630,885 B2 | 10/2003 | Hardman et al. |
| 6,633,229 B1 | 10/2003 | Normann et al. |
| 6,662,642 B2 | 12/2003 | Breed et al. |
| 6,667,687 B1 | 12/2003 | DeZori |
| 6,681,164 B2 | 1/2004 | Berghoff et al. |
| 6,693,522 B2 | 2/2004 | Tang et al. |
| 6,704,364 B1 | 3/2004 | Lim et al. |
| 6,705,155 B2 | 3/2004 | Katou |
| 6,710,708 B2 | 3/2004 | McClelland et al. |
| 6,731,205 B2 | 5/2004 | Schofield et al. |
| 6,737,965 B2 | 5/2004 | Okubo |
| 6,738,697 B2 | 5/2004 | Breed |
| 6,747,590 B1 | 6/2004 | Weber |
| 6,750,761 B1 | 6/2004 | Newman |
| 6,774,778 B2 | 8/2004 | Lin |
| 6,778,380 B2 | 8/2004 | Murray |
| 6,788,193 B2 | 9/2004 | King et al. |
| 6,794,993 B1 | 9/2004 | Kessler et al. |
| 6,801,872 B2 | 10/2004 | Normann et al. |
| 6,802,213 B1 | 10/2004 | Agrotis |
| 6,804,999 B2 | 10/2004 | Okubo |
| 6,822,603 B1 | 11/2004 | Crimmins et al. |
| 6,828,905 B2 | 12/2004 | Normann et al. |
| 6,832,573 B2 | 12/2004 | Evans et al. |
| 6,871,157 B2 | 3/2005 | Lefaure |
| 6,879,252 B2 | 4/2005 | DeZorzi et al. |
| 6,885,282 B2 | 4/2005 | Desai |
| 6,885,292 B2 | 4/2005 | Katou |
| 6,885,293 B2 | 4/2005 | Okumura |
| 6,885,296 B2 | 4/2005 | Hardman et al. |
| 6,888,471 B2 | 5/2005 | Elsner et al. |
| 6,897,770 B2 | 5/2005 | Lill |
| 6,904,796 B2 | 6/2005 | Pacsai et al. |
| 6,906,624 B2 | 6/2005 | McClelland et al. |
| 6,910,627 B1 | 6/2005 | Simpson-Young et al. |
| 6,914,523 B2 | 7/2005 | Munch et al. |
| 6,915,146 B1 | 7/2005 | Nguyen et al. |
| 6,915,229 B2 | 7/2005 | Taguchi et al. |
| 6,919,798 B2 | 7/2005 | Ide |
| 6,920,785 B2 | 7/2005 | Toyofuku |
| 6,922,140 B2 | 7/2005 | Hernando et al. |
| 6,927,679 B2 | 8/2005 | Taguchi et al. |
| 6,941,803 B2 | 9/2005 | Hirohama et al. |
| 6,972,671 B2 | 12/2005 | Normann et al. |
| 6,983,649 B2 | 1/2006 | Katou |
| 6,996,418 B2 | 2/2006 | Teo et al. |
| 7,002,455 B2 | 2/2006 | Buck et al. |
| 7,010,968 B2 | 3/2006 | Stewart et al. |
| 7,015,801 B1 | 3/2006 | Juzswik |
| 7,017,403 B2 | 3/2006 | Normann et al. |
| 7,034,661 B2 | 4/2006 | Lonsdale et al. |
| 7,039,397 B2 | 5/2006 | Chuey |

(56) References Cited

U.S. PATENT DOCUMENTS

| | | | |
|---|---|---|---|
| 7,042,348 B2 | 5/2006 | Schulze et al. |
| 7,050,794 B2 | 5/2006 | Chuey et al. |
| 7,084,749 B1 | 8/2006 | Honeck et al. |
| 7,084,751 B2 | 8/2006 | Klamer |
| 7,088,226 B2 | 8/2006 | McClelland et al. |
| 7,095,316 B2 | 8/2006 | Kachouh et al. |
| 7,096,003 B2 | 8/2006 | Joao et al. |
| 7,103,460 B1 | 9/2006 | Breed |
| 7,104,438 B2 | 9/2006 | Benedict |
| 7,113,083 B2 | 9/2006 | Suitsu |
| 7,116,213 B2 | 10/2006 | Thiesen et al. |
| 7,116,218 B2 | 10/2006 | Ogawa et al. |
| 7,120,430 B2 | 10/2006 | Christenson et al. |
| 7,137,296 B2 | 11/2006 | Shida et al. |
| 7,148,793 B2 | 12/2006 | Lin |
| 7,161,466 B2 | 1/2007 | Chuey |
| 7,161,476 B2 | 1/2007 | Hardman et al. |
| 7,164,117 B2 | 1/2007 | Breed et al. |
| 7,173,520 B2 | 2/2007 | Desai et al. |
| 7,224,269 B2 | 5/2007 | Miller et al. |
| 7,243,535 B2 | 7/2007 | Shimura |
| 7,254,994 B2 | 8/2007 | Schulze et al. |
| 7,307,480 B2 | 12/2007 | Shiu et al. |
| 7,315,240 B2 | 1/2008 | Watabe |
| 7,318,162 B2 | 1/2008 | Rineer et al. |
| 7,369,491 B1 | 5/2008 | Beshai et al. |
| 7,380,450 B2 | 6/2008 | Durif |
| 7,382,239 B2 | 6/2008 | Song et al. |
| 7,414,523 B2 | 8/2008 | Li et al. |
| 7,453,350 B2 | 11/2008 | Kachouh et al. |
| 7,478,554 B2 | 1/2009 | Roth et al. |
| 7,508,762 B2 | 3/2009 | Ohtani |
| 7,512,109 B2 | 3/2009 | Trott et al. |
| 7,518,495 B2 | 4/2009 | Tang et al. |
| 7,519,011 B2 | 4/2009 | Petrus et al. |
| 7,535,841 B1 | 5/2009 | Beshai et al. |
| 7,642,904 B2 | 1/2010 | Crano |
| 7,663,502 B2 | 2/2010 | Breed |
| 7,688,192 B2 | 3/2010 | Kenny et al. |
| 7,697,497 B2 | 4/2010 | Grube et al. |
| 7,817,543 B2 | 10/2010 | Beshai et al. |
| 7,884,707 B2 | 2/2011 | Wittliff et al. |
| 7,885,603 B2 | 2/2011 | Santavicca |
| 7,895,886 B2 | 3/2011 | Tozawa et al. |
| 7,900,198 B2 | 3/2011 | Kasman |
| 7,948,364 B2 | 5/2011 | Lin et al. |
| 8,013,725 B2 | 9/2011 | Murata et al. |
| 8,015,864 B2 * | 9/2011 | Petrucelli ............... G01L 17/00 |
| | | 73/146.8 |
| 8,019,323 B2 | 9/2011 | Jheng et al. |
| 8,027,359 B2 | 9/2011 | Iwamura |
| 8,031,598 B2 | 10/2011 | Beshai et al. |
| 8,035,257 B2 | 10/2011 | Fornage |
| 8,049,533 B1 | 11/2011 | Lin |
| 8,082,579 B2 | 12/2011 | Shimizu et al. |
| 8,155,617 B2 | 4/2012 | Magnusson et al. |
| 8,185,093 B2 | 5/2012 | Jheng et al. |
| 8,319,378 B2 | 11/2012 | Fornage |
| 8,330,594 B2 | 12/2012 | Suzuki et al. |
| 8,332,104 B2 | 12/2012 | Greer et al. |
| 8,576,060 B2 | 11/2013 | Deniau et al. |
| 2001/0050611 A1 | 12/2001 | Achterholt |
| 2002/0030592 A1 | 3/2002 | Laitsaari et al. |
| 2002/0059825 A1 | 5/2002 | Lundqvist |
| 2002/0067285 A1 | 6/2002 | Lill |
| 2002/0075145 A1 | 6/2002 | Hardman et al. |
| 2002/0084895 A1 | 7/2002 | Dixit et al. |
| 2002/0086708 A1 | 7/2002 | Teo et al. |
| 2002/0087250 A1 * | 7/2002 | Pacsai ............... B60C 23/0408 |
| | | 701/78 |
| 2002/0121132 A1 | 9/2002 | Breed et al. |
| 2002/0126005 A1 | 9/2002 | Hardman et al. |
| 2002/0130803 A1 | 9/2002 | Conway et al. |
| 2002/0144134 A1 | 10/2002 | Watanabe et al. |
| 2002/0168795 A1 | 11/2002 | Schuumans |
| 2002/0186320 A1 | 12/2002 | Carlsgaard |
| 2002/0190852 A1 | 12/2002 | Lin |
| 2003/0005759 A1 | 1/2003 | Breed et al. |
| 2003/0009270 A1 | 1/2003 | Breed |
| 2003/0030553 A1 | 2/2003 | Schofield et al. |
| 2003/0050070 A1 | 3/2003 | Mashinsky et al. |
| 2003/0071723 A1 | 4/2003 | Tang et al. |
| 2003/0079537 A1 | 5/2003 | Luce |
| 2003/0080860 A1 | 5/2003 | Stewart et al. |
| 2003/0080861 A1 | 5/2003 | Okubo |
| 2003/0095553 A1 | 5/2003 | Shiomoto et al. |
| 2003/0110851 A1 | 6/2003 | Tsujita |
| 2003/0112138 A1 | 6/2003 | Marguet et al. |
| 2003/0117276 A1 | 6/2003 | Marguet et al. |
| 2003/0117277 A1 | 6/2003 | Marguet et al. |
| 2003/0122660 A1 | 7/2003 | Kachouh et al. |
| 2003/0131297 A1 | 7/2003 | Fischel et al. |
| 2003/0179082 A1 | 9/2003 | Ide |
| 2003/0197594 A1 | 10/2003 | Olson et al. |
| 2003/0197595 A1 | 10/2003 | Olson et al. |
| 2003/0197603 A1 | 10/2003 | Stewart et al. |
| 2003/0197604 A1 | 10/2003 | Ogawa et al. |
| 2003/0201783 A1 * | 10/2003 | Steber ................ G01V 3/15 |
| | | 324/661 |
| 2003/0228879 A1 | 12/2003 | Witkowski |
| 2004/0027241 A1 | 2/2004 | Forster |
| 2004/0039509 A1 | 2/2004 | Breed |
| 2004/0041698 A1 | 3/2004 | Lin |
| 2004/0061601 A1 | 4/2004 | Freakes |
| 2004/0113765 A1 * | 6/2004 | Suitsu ................ B60C 23/0408 |
| | | 340/445 |
| 2004/0130442 A1 | 7/2004 | Breed et al. |
| 2004/0149025 A1 | 8/2004 | Toyofuku |
| 2004/0172179 A1 | 9/2004 | Miwa |
| 2004/0174246 A1 | 9/2004 | Mitchell |
| 2004/0203370 A1 | 10/2004 | Luo et al. |
| 2004/0215382 A1 | 10/2004 | Breed et al. |
| 2005/0039103 A1 | 2/2005 | Azenko et al. |
| 2005/0046584 A1 | 3/2005 | Breed |
| 2005/0075145 A1 | 4/2005 | Dvorak et al. |
| 2005/0104722 A1 | 5/2005 | Tang et al. |
| 2005/0132792 A1 * | 6/2005 | Lemense ............. B60C 23/0416 |
| | | 73/146.4 |
| 2005/0134446 A1 | 6/2005 | Stewart et al. |
| 2005/0156722 A1 | 7/2005 | McCall et al. |
| 2005/0179530 A1 | 8/2005 | Stewart et al. |
| 2005/0192727 A1 | 9/2005 | Shostak et al. |
| 2005/0264405 A1 | 12/2005 | Ueda |
| 2006/0001535 A1 | 1/2006 | Hafele et al. |
| 2006/0006992 A1 | 1/2006 | Daiss et al. |
| 2006/0012475 A1 | 1/2006 | Froitzheim et al. |
| 2006/0017554 A1 | 1/2006 | Stewart et al. |
| 2006/0022813 A1 | 2/2006 | Schulze et al. |
| 2006/0025897 A1 | 2/2006 | Shostak et al. |
| 2006/0044125 A1 | 3/2006 | Pierbon |
| 2006/0114107 A1 | 6/2006 | Kim et al. |
| 2006/0145829 A1 | 7/2006 | Watabe |
| 2006/0148456 A1 | 7/2006 | Chuey |
| 2006/0152342 A1 | 7/2006 | Turner et al. |
| 2006/0161327 A1 | 7/2006 | Emmerich et al. |
| 2006/0187014 A1 | 8/2006 | Li et al. |
| 2006/0192661 A1 | 8/2006 | Gerardiere |
| 2006/0201241 A1 | 9/2006 | Durif |
| 2006/0217850 A1 | 9/2006 | Geerlings et al. |
| 2006/0235641 A1 | 10/2006 | Fink et al. |
| 2006/0273889 A1 | 12/2006 | Schulze et al. |
| 2006/0277989 A1 * | 12/2006 | Lee .................. G01K 1/045 |
| | | 73/146.8 |
| 2007/0063814 A1 | 3/2007 | Olson et al. |
| 2007/0069947 A1 | 3/2007 | Banet et al. |
| 2007/0090936 A1 | 4/2007 | Nornes |
| 2007/0176736 A1 | 8/2007 | Chuey et al. |
| 2007/0182531 A1 | 8/2007 | Kuchler |
| 2007/0190993 A1 | 8/2007 | Chuey et al. |
| 2007/0194898 A1 | 8/2007 | Fukumori |
| 2007/0210920 A1 | 9/2007 | Panotopoulos |
| 2007/0213951 A1 | 9/2007 | Van Eeden |
| 2007/0223484 A1 | 9/2007 | Crowle et al. |
| 2007/0247294 A1 | 10/2007 | Baader et al. |

(56) References Cited

U.S. PATENT DOCUMENTS

| | | | |
|---|---|---|---|
| 2007/0279201 A1 | 12/2007 | Casey et al. | |
| 2008/0001729 A1* | 1/2008 | Kyllmann | B60C 23/009 340/445 |
| 2008/0024287 A1 | 1/2008 | Boyle et al. | |
| 2008/0037458 A1 | 2/2008 | Myszne | |
| 2008/0062880 A1 | 3/2008 | Yew et al. | |
| 2008/0080447 A1 | 4/2008 | Grube et al. | |
| 2008/0094198 A1 | 4/2008 | Yu | |
| 2008/0100430 A1 | 5/2008 | Kochie et al. | |
| 2008/0141766 A1 | 6/2008 | Roth et al. | |
| 2008/0143593 A1 | 6/2008 | Graziano et al. | |
| 2008/0157954 A1 | 7/2008 | Tsuchida | |
| 2008/0165688 A1 | 7/2008 | Beshai et al. | |
| 2008/0173082 A1 | 7/2008 | Hettle et al. | |
| 2008/0177441 A1 | 7/2008 | Marlett et al. | |
| 2008/0204217 A1 | 8/2008 | Costello et al. | |
| 2008/0205553 A1 | 8/2008 | Costello et al. | |
| 2008/0211672 A1 | 9/2008 | Pei | |
| 2008/0240283 A1 | 10/2008 | Iwamura | |
| 2008/0256260 A1 | 10/2008 | Magnusson et al. | |
| 2008/0282965 A1 | 11/2008 | Crano | |
| 2008/0285507 A1 | 11/2008 | Mukherjee et al. | |
| 2008/0320243 A1 | 12/2008 | Mitsuzuka et al. | |
| 2009/0021362 A1* | 1/2009 | Kochie | G07C 5/008 340/442 |
| 2009/0033478 A1 | 2/2009 | Deniau et al. | |
| 2009/0045930 A1 | 2/2009 | Fu | |
| 2009/0067854 A1 | 3/2009 | Yokogawa et al. | |
| 2009/0070863 A1 | 3/2009 | Shimizu et al. | |
| 2009/0108992 A1 | 4/2009 | Shafer | |
| 2009/0109012 A1* | 4/2009 | Petrucelli | B60C 23/0401 340/445 |
| 2009/0179747 A1 | 7/2009 | Lin et al. | |
| 2009/0184815 A1 | 7/2009 | Suzuki et al. | |
| 2009/0207859 A1 | 8/2009 | Beshai et al. | |
| 2009/0224901 A1* | 9/2009 | Yu | B60C 23/0408 340/447 |
| 2009/0231114 A1 | 9/2009 | Yu | |
| 2009/0245803 A1 | 10/2009 | Garner et al. | |
| 2009/0267751 A1 | 10/2009 | Kaleal | |
| 2009/0291710 A1 | 11/2009 | Jheng et al. | |
| 2009/0310477 A1 | 12/2009 | Lee et al. | |
| 2010/0071453 A1 | 3/2010 | Isono | |
| 2010/0308987 A1 | 12/2010 | Haas et al. | |
| 2011/0140876 A1 | 6/2011 | Deniau | |
| 2011/0181321 A1 | 7/2011 | Matsudera | |
| 2011/0211414 A1 | 9/2011 | Musha | |
| 2011/0250860 A1 | 10/2011 | Lin | |
| 2011/0267024 A1 | 11/2011 | Halberstadt | |
| 2011/0294548 A1 | 12/2011 | Jheng et al. | |
| 2012/0001745 A1 | 1/2012 | Li | |
| 2012/0117788 A1 | 5/2012 | Deniau | |
| 2012/0119895 A1 | 5/2012 | Deniau | |
| 2012/0139751 A1* | 6/2012 | Lin | B60C 23/0479 340/870.07 |
| 2012/0147184 A1 | 6/2012 | Siann et al. | |
| 2012/0185110 A1 | 7/2012 | Deniau et al. | |
| 2012/0274461 A1 | 11/2012 | Colombo et al. | |
| 2013/0282231 A1* | 10/2013 | Farr | G06F 7/00 701/34.4 |
| 2014/0139332 A1* | 5/2014 | Mouchet | B60C 23/0479 340/442 |
| 2015/0015389 A1* | 1/2015 | McIntyre | B60C 23/0471 340/447 |
| 2015/0015390 A1* | 1/2015 | McIntyre | B60C 23/0471 340/447 |

FOREIGN PATENT DOCUMENTS

| | | |
|---|---|---|
| DE | 4492128 | 6/1996 |
| DE | 19503756 | 8/1996 |
| DE | 19720123 | 7/1998 |
| DE | 19924830 | 11/2000 |
| DE | 10014076 | 10/2001 |
| DE | 10040238 | 3/2002 |
| DE | 10247761 | 6/2003 |
| DE | 10217239 | 7/2003 |
| DE | 10207014 | 8/2003 |
| DE | 10307265 | 10/2003 |
| DE | 69529456 | 11/2003 |
| DE | 10247149 | 4/2004 |
| DE | 60108973 | 7/2005 |
| DE | 60202342 | 12/2005 |
| DE | 60023387 | 7/2006 |
| DE | 102005004825 | 8/2006 |
| DE | 102005059009 | 6/2007 |
| DE | 102007039599 | 3/2009 |
| DE | 102008008237 | 8/2009 |
| DE | 102008033051 | 2/2010 |
| EP | 793579 | 9/1997 |
| EP | 1013483 A2 | 6/2000 |
| EP | 1026016 | 8/2000 |
| EP | 1291230 | 3/2003 |
| EP | 1428694 A2 | 12/2003 |
| EP | 1440824 A2 | 7/2004 |
| EP | 1494877 | 1/2005 |
| EP | 1536392 A1 | 6/2005 |
| EP | 1547827 | 6/2005 |
| EP | 1562162 | 8/2005 |
| EP | 1026015 | 5/2006 |
| EP | 1674299 A2 | 6/2006 |
| EP | 1352763 | 4/2008 |
| EP | 1340629 | 6/2008 |
| GB | 2387032 | 10/2003 |
| GB | 2420415 | 5/2006 |
| GB | 2500697 A | 10/2013 |
| JP | 62003537 | 1/1987 |
| JP | 63090407 A | 4/1988 |
| JP | 05107134 | 4/1993 |
| JP | 8244423 | 9/1996 |
| JP | 2000142044 | 5/2000 |
| JP | 2000238515 | 9/2000 |
| JP | 2001080321 | 3/2001 |
| JP | 2001312860 A | 9/2001 |
| JP | 2002064404 A | 2/2002 |
| JP | 03025817 | 1/2003 |
| JP | 2003025817 | 1/2003 |
| JP | 2003-312220 | 11/2003 |
| JP | 2004-145474 | 5/2004 |
| JP | 2005289116 | 10/2005 |
| JP | 2006015832 | 1/2006 |
| JP | 2007010427 A | 1/2007 |
| JP | 2007200081 | 8/2007 |
| JP | 2007283816 | 11/2007 |
| JP | 2008137585 | 6/2008 |
| JP | 4265448 B2 | 2/2009 |
| JP | 5502729 B2 | 5/2014 |
| KR | 03068216 | 8/2003 |
| KR | 1020070040883 A | 4/2007 |
| KR | 10-2009-0091001 | 8/2009 |
| RU | 38461 U1 | 6/2004 |
| RU | 2238190 | 10/2004 |
| RU | 2398680 C2 | 6/2006 |
| RU | 2409480 C2 | 7/2006 |
| RU | 2352473 C1 | 4/2009 |
| WO | 9420317 | 9/1994 |
| WO | 9422693 | 10/1994 |
| WO | 9908887 | 2/1999 |
| WO | 0072463 | 11/2000 |
| WO | 0145967 | 6/2001 |
| WO | 02094588 | 11/2002 |
| WO | 03016079 | 2/2003 |
| WO | 2004038674 | 5/2004 |
| WO | 2005085651 | 9/2005 |
| WO | 2005116603 | 12/2005 |
| WO | 2007/006871 A1 | 1/2007 |
| WO | 2009006518 | 1/2008 |
| WO | 2008-103973 A1 | 8/2008 |
| WO | 2008106387 | 9/2008 |
| WO | 2008107430 | 9/2008 |
| WO | 2012/097154 A1 | 7/2012 |
| WO | 2013/063061 A1 | 5/2013 |

(56) References Cited

FOREIGN PATENT DOCUMENTS

| WO | WO 2013063061 A1 * | 5/2013 | ............ B60C 23/02 |
|---|---|---|---|
| WO | 2013/152294 A1 | 10/2013 | |
| WO | 2015/015692 A1 | 2/2015 | |

OTHER PUBLICATIONS

"Sony Remote Commander Operating Instructions RM-V701/V801", 1998, Sony Corporation.
"Philips Magnavox 4 Function with Back Lighted Keypad Universal Remote" Operating Instructions, printed Oct. 2012, Philips Electronics North America Corporation.
"RadioShack 8-In-One Touch Screen Remote Control", Owner's Manual, 2001, RadioShack Corporation.
Kais Mnif, "A Smart Tire Pressure Monitoring System", Sensors Magazine, Nov. 1, 2001.
International Search Report and Written Opinion dated Sep. 28, 2012, from corresponding International Patent Application No. PCT/US2011/047112.
International Search Report dated Apr. 6, 2012, from corresponding International Patent Application No. PCT/US2011/047087.
International Search Report and Written Opinion mailed on Oct. 15, 2008, for Application No. PCT/US2008/069006.
International Preliminary Report on Patentability mailed on Jan. 14, 2010, for Application No. PCT/US2008/069006.
Chinese Office Action mailed on Apr. 19, 2011, for Chinese Application 200880023390.7 (Corresponding to PCT/US2008/069006).
Chinese Office Action (second) mailed on Feb. 16, 2012, for Chinese Application 200880023390.7 (Corresponding to PCT/US2008/069006).
Chinese Office Action (third) mailed on Oct. 10, 2012, for Chinese Application 200880023390.7 (Corresponding to PCT/US2008/069006).
Japanese Office Action mailed on Jun. 7, 2012, for JP Application 2010-515252 (Corresponding to PCT/US2008/069006).
International Search Report and Written Opinion dated Sep. 28, 2012, from corresponding International Patent Application No. PCT/US2011/047104.
Germany Office Action dated Nov. 19, 2012.
Germany Office Action dated Sep. 17, 2007.
Preliminary Invalidity Contentions of Defendant Continental Automotive Systems US, Inc.; dated Jan. 17, 2012, In the United States District Court for Western District of Virginia Lynchburg Division, Civil Action No. 6:11-CV-00014-NKM.
Amended Invalidity Contentions of Defendant Continental Automotive Systems US, Inc.; dated Jun. 18, 2012, In the United States District Court for Eastern District of Michigan Southern Division, Civil Action No. 2:12-CV-10715-SJM-MJH.
Plaintiffs' Initial Infringement Contentions; dated Dec. 15, 2011, In The United States District Court for Western District of Virginia Lynchburg Division, Civil Action No. 6:11-CV-00014-NKM-RSB.
Joint Claim Construction and Prehearing Statement, dated Jun. 11, 2012, from co-pending litigation: *Schrader-Bridgeport Int'l, Inc.* v. *Continental Automotive Sys, US, Inc.*, case docket No. 2:12-CV-10715-SJM-MJH, (filed Feb. 16, 2012, E.D. Mich.).
Plaintiffs' Opening Claim Construction Brief, dated Jun. 26, 2012, from co-pending litigation: *Schrader-Bridgeport Int'l, Inc.* v. *Continental Automotive Sys, US, Inc.*, case docket No. 2:12-CV-10715-SJM-MJH, (filed Feb. 16, 2012, E.D. Mich.).
USPTO Translation of JP2003025817A, translated from Japanese by Schreiber Translations, Inc., Feb. 2013.
Jeff Burgess, "TPMS Demonstration Kit", AN1943/D, Rev 1, Apr. 2002, Motorola, Inc., 2002 (16 pgs.).
Machine Translation of RU2423246 C1.
Translation of Abstract of KR1020070040883A.
Search Report dated Aug. 20, 2015, from GB Patent Application No. GB1503824.3.
International Search Report and Written Opinion dated Sep. 28, 2012, from corresponding International Patent Application No. PCT/US2011/047108.
Search Report dated Jun. 20, 2014, from EP Patent Application No. 11870613.4.
Search Report dated Jun. 30, 2014, from EP Patent Application No. 11870701.7.
Search Report dated Mar. 24, 2015, from EP Patent Application No. 11870650.6.
Search Report dated Apr. 19, 2012, from International Patent Application No. PCT/US2012/021082.
Jeff Burgess, "Tire Pressure Monitoring System Reference Design", Tire Pressure Monitor System Demo, AN1951/D, Rev 1, May 2003, Motorola, Inc., 2003 (24 pgs.).
"Motorola's MPXY8000 Series Tire Pressure Monitoring Sensors", Motorola Sensor Products Division Transportation & Standard Products Group, Motorola, Inc., May 2003 (22 pgs.).
Alfred Pohl et al. "Wirelessly Interrogable Surface Acoustic Wave Sensors for Vehicular Applications", IEEE Transactions On Instrumentation and Measurement vol. 46, No. 4, IEEE, Aug. 1997 (8 pgs..).
"Tire pressure Warning System Using Direct Measurement Method (Soarer)" G0880A ISSN: 0388-3841, vol. 51 No. 7, pp. 174-179, Toyota Motor Corporation, May 2, 2002 (6 pgs.).

* cited by examiner

PRESSURE CHECK TOOL AND METHOD OF OPERATING THE SAME

TECHNICAL FIELD

This application relates to tire pressure checking tools and the utilization of these tools.

BACKGROUND OF THE INVENTION

Rental vehicles from rental agencies typically do not have any valve caps on the valve stems of the vehicle wheels of the rental vehicles. The absence of valve caps is not because the cars were built this way by the different original equipment manufacturers (OEMs), but because rental agency employees do not want to handle the valve caps. Every time a vehicle is returned to the rental office, the agency is obligated, as a normal check up of the vehicle, to verify the pressure in each tire of the returned vehicle even if this vehicle could be equipped with an individual pressure display of each tire on the instrument panel of the vehicle.

In these situations, a technician has to remove the valve caps, one at a time, use a tire gauge and make a manual note with the corresponding vehicle identification number (VIN) that the vehicle has the correct pressure in the tires. Knowing that the technician will have to remove the caps again when the vehicle comes back from the next customer, the technician never bothers to put the caps on in order to save time, or over-inflates the tire to minimize having to deal with future pressure checks and re-inflations.

The valve cap of a valve stem has different critical functions. First, it protects the valve core mechanism of the valve stem against dirt, salt, and debris from the road and other sources that could eventually damage the valve core mechanism. If the valve core mechanism is damaged, its spring and seal functions could lead to potential leaks. If debris goes though the open valve mechanism during tire inflation, this debris could interfere with the valve core sealing cup mechanism leading to leaks.

Many late model vehicle valve caps, especially those equipped with tire pressure monitoring systems (TPMS), also have an O-ring seal that seals the valve stem from debris, water and so forth. This further improves the tightness of the valve stem assembly against air leaks by acting as a secondary seal. If the valve cap is not placed on the valve stem, or if some debris are located around the valve core mechanism spring, or if some debris are stuck on the cup seal, some potential air leaks could happen leading eventually to a leaking or flat tire. Furthermore, failure to reinstall valve caps exposes the end of the valve stem and valve core to potentially highly corrosive brine solutions used for ice melting on highways, automotive/wheel cleaning chemicals, and so forth.

The non-replacement of the caps potentially results in the above-mentioned problems. Consequently, some user dissatisfaction has resulted from these previous instances where the cap is not reinstalled.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are described herein that provide a tool that reads identification information from the vehicle (typically via dash VIN reading/recognition or via barcode scan in the door jamb, but other methods are possible) and automatically determines the type(s) of tire pressure sensor low frequency (LF) trigger, radio frequency (RF) protocol, or other possible method to trigger the TPMS sensors mounted on the vehicle, in addition to the recommended cold pressures (RCP) for the vehicle tires. Responsively, information is received from the vehicle including tire pressure information such that the valve caps do not have to be removed. Consequently, better tire pressure control, increased productivity and a reduction in potential for erroneous records by the technician performing the tire service work, increased safety for drivers renting the vehicles, potentially decreased liability of the rental agencies, and improved vehicle maintenance history are all provided.

Based upon the captured vehicle information via the VIN, etc., reading, one or more tire pressure sensor activation/trigger methods are determined. The determined one or more tire pressure sensor activation/trigger methods are then used to activate the sensors without further input from the tire pressure check tool user. The sensors are then triggered one-at-a-time via the tire sidewall with the described handheld tire pressure check tool (typically in an outdoor car return collection lot), or multiples could also be simultaneously triggered in a more shop type environment (such as a reconditioning shop "assembly line") via the described handheld tool or perhaps in combination with hardwired LF triggers in the shop, but other methods are possible. Tire pressure information is responsively received from the activated tire pressure monitoring (TPM) sensors.

In some aspects, the tire pressure information is presented to a user via, a screen on the tool. In other aspects, a determination is made as to whether the tire pressure information falls below a predetermined first threshold or above a predetermined second threshold. In still other aspects, the information is transmitted to a central location such as a rental agency office. More detailed vehicle information could also be retrieved by the tool via the VIN and TPM sensors as will later be outlined.

In other of these embodiments, a portable tool that is configured to obtain data from a TPM sensor includes an interface and a controller. The interface has an input and an output. Alternatively, the tool could also be hardwired in the garage or outdoor service facility to trigger the vehicle TPM sensors automatically upon being driven through an LF trigger field.

The controller is coupled to the interface and is configured to request vehicle identification information at the output and responsively receive the requested vehicle identification information from a vehicle at the input. The controller is further configured to, based upon the received vehicle information, determine one or more tire pressure sensing approaches or parameters. The controller is configured to use the determined one or more tire pressure sensing approaches or parameters to activate a plurality of tire pressure monitoring (TPM) sensors at the vehicle via the output. The controller is further configured to responsively receive tire pressure information at the input from the activated TPM sensors.

Figure 1:
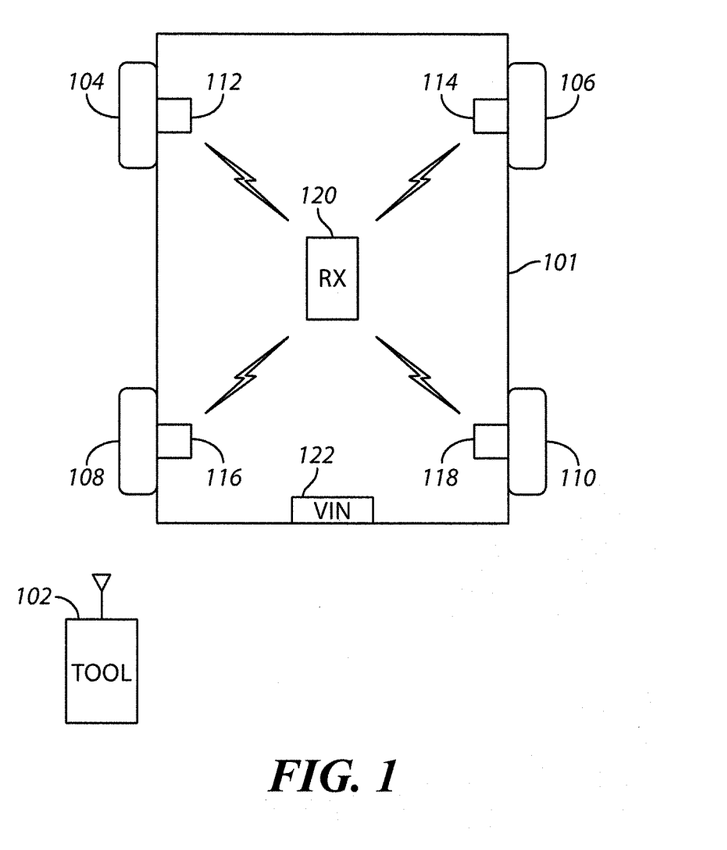
FIG. 1 comprises a block diagram of a system for using a multi-function tire pressure check tool according to various embodiments of the present invention.

Referring now to FIG. 1, a tool and system are described. A technician uses a tool 102 to scan a first tire 104, a second tire 106, a third tire 108, and a fourth tire 110 on a vehicle 101. The first tire 104 has an associated first TPM sensor (or monitor or wheel unit) 112; the second tire 106 has an associated second TPM sensor 114; the third tire 108 has an associated third TPM sensor 116; and the fourth tire 110 has an associated TPM sensor 118. Although the approaches described herein have particular applicability in a vehicle rental agency environment for rental agency applications, it will be understood that these approaches are not limited to this particular environment and may, in fact, be used in any appropriate environment or location such as maintenance or repair facilities, garages, toll facilities, truck weigh stations, or car dealers.

The sensors 112, 114, 116, and 118 communicate with a receiver 120. The communication between the TPMS monitors 112, 114, 116, and 118 and the receiver 120 is accomplished in one aspect via wireless, radio frequency (RF) links, but other methods are possible.

The TPMS monitors 112, 114, 116, and 118 may include processing devices and memories and execute computer instructions to sense and transmit tire pressure (or other) data. In these regards, the TPMS monitors 112, 114, 116, and 118 may themselves include structures, devices, or apparatus that actually sense the pressure (or other types of data) in the tires 104, 106, 108 and 110.

The receiver 120 includes hardware and/or software to receive (and in some examples transmit) information from the TPMS monitors 112, 114, 116, and 118. The receiver 120 is disposed at an appropriate location within the vehicle 101.

Since the maintenance technician has to perform the task to check the air pressure every time a vehicle is returned and has to complete a check list, it is typically more efficient (e.g., in terms of cost, time, accuracy of data and so forth) to offer per rental agency the tool 102 which reads the VIN 122 of the vehicle 101. The VIN 122 (or other vehicle identification information) of the vehicle 101 can be read by any appropriate approach. The tool 102 then determines which kind or type of LF protocol, Recommended Cold Pressures (RCPs) (which could be different pressures between front and rear tires if the vehicle has a split placard configuration from the OEM), and/or the appropriate RF protocol to be used to trigger the TPM sensors 112, 114, 116, and 118 (note that 4 sensors are only used here as a typical example, but more or less sensors are possible) mounted on the vehicle 101. The tool 102 triggers each sensor 112, 114, 116, and 118 on the vehicle, records and displays the pressure for each tire on the said vehicle including their location (e.g., left front, right front, left rear, and right rear). The display may be made according to a display screen on the tool 102.

The LF approach may relate to different LF transmission frequencies that are used to wake up the TPM sensor 112, 114, 116, and 118. The LF approach is typically different for different automobile manufacturers. The RF transmission protocol may relate to the data format or baud rate (to mention two examples) used to transmit information from the TPM sensors 112, 114, 116, and 118. The RF transmission protocol is typically different for different automobile manufacturers.

This information (e.g., tire pressure and location) obtained from the TPM sensors can be used by the rental agency to manage tire rotation history, if the sensors are embedded in the tire or otherwise somehow married to the tire. It can also be of particular benefit for vehicles with a split placard (i.e., pressure in the tires is different for front tires and rear) to ensure proper pressures for both front and rear tires. Other information that could be displayed/connected for traceability and record keeping is the associated VIN, the date, and the time of the day the check was performed. This information could provide a clear history of the vehicle tire maintenance. Also, the technician's name that performed the check can also be displayed.

All the data could be recorded in a database either in the tool, printed on a built-in or separate printer, or transmitted (e.g., via a wireless local area network (WLAN), via Bluetooth, or via some other wired or wireless connection) to another location (e.g., a docketing station within the rental agency office).

The tool 102 could also indicate to the user that the tire is properly inflated via color coding with a green light or other symbol or on a small screen in the vehicle 101. In this case, the tool is automatically comparing known RCPs or other information against the test samples that were just recorded, and as such, the technician does not need to remove the cap and inflate or deflate the tire (time and money saved). If the tire is underinflated or over inflated, a yellow (minimal difference) light or red (significant difference) light or other symbols could be lit on the tool 102 or at some other location. A small screen on the tool 102 or some other location (e.g., a central location such as the headquarters of the rental agency) could also display the current pressure with the RCP of the vehicle or by how much air pressure (e.g., as measured in psi, and so forth) the tire needs to be deflated or inflated.

For vehicles that are returned without time for the tires to cool down before the technician performs a tire check, the tool 102 could be equipped with a simple temperature sensor that would automatically compensate the received tire pressure temperature with air temperature inside the tire (received) and the external ambient temperature. The operator could be offered this option or the tool could be equipped with an integrated thermometer tip that automatically makes this adjustment without further involvement by the operator.

In order to simplify the tool and to reduce tool costs and tool updates, each agency could choose from the tool supplier cataloging the applicable model, brand, and model year of the vehicles in the fleet (cost of tool could be linked to required vehicle coverage). Tools could also capture the embedded in the tire radio frequency identification (RFID) chip data. With this extended data, the rental agencies could keep track of the age of the tires on a specific vehicle, verify that the original tires weren't stolen off the vehicle (happens often with rental fleets), tire maintenance schedule, tire/ vehicle compatibility (regarding load ratings, and so forth), tire recall history, and so forth.

The tool could also have a Bluetooth connection or via any wireless connections to the vehicle. Upon a button press on the vehicle internet protocol (IP), the latest received TPM data by the TPM receiver of the said vehicle could be transferred directly to the tool.

Consequently, better tire pressure control, increased productivity of the technician performing the work, increased safety for drivers renting the vehicles, potentially decreased liability of the rental agencies, and improved vehicle maintenance history are all provided.

Figure 2:
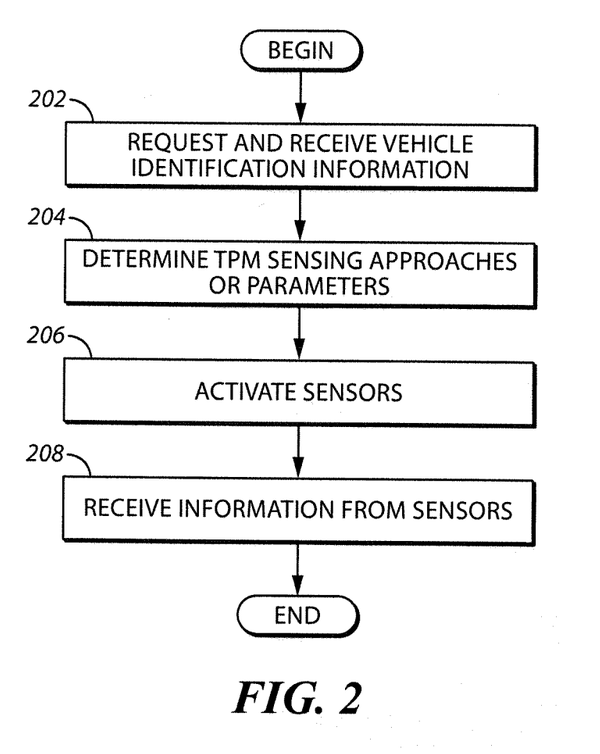
FIG. 2 comprises a flowchart of an approach for using a multi-function (described herein) tire pressure check tool according to various embodiments of the present invention.

Referring now to FIG. 2, one example of an approach for using a pressure check tool is described. At step 202 and at a portable tool, vehicle identification information is requested from a vehicle and responsively received from the vehicle. At step 204 and based upon the vehicle information, one or more tire pressure sensing approaches or parameters are determined. In some examples, the one or more tire pressure sensing approaches or parameters include a low frequency (LF) protocol and a radio frequency (RF) protocol. Other examples are possible. In other examples, the vehicle identification information comprises a vehicle identification number (VIN). Other examples are possible.

At step 206, the determined one or more tire pressure sensor trigger signals are used to activate singularly or activate a plurality of tire pressure monitoring (TPM) sensors at the vehicle. At step 208, tire pressure information is responsively received from the activated TPM sensors.

In some aspects, the tire pressure information is presented to a user via a screen on the portable tool. In other aspects, a determination is made as to whether the tire pressure information falls below a predetermined first threshold or above a predetermined second threshold. In still other aspects, the information is transmitted to a central location such as a rental agency office.

Figure 3:
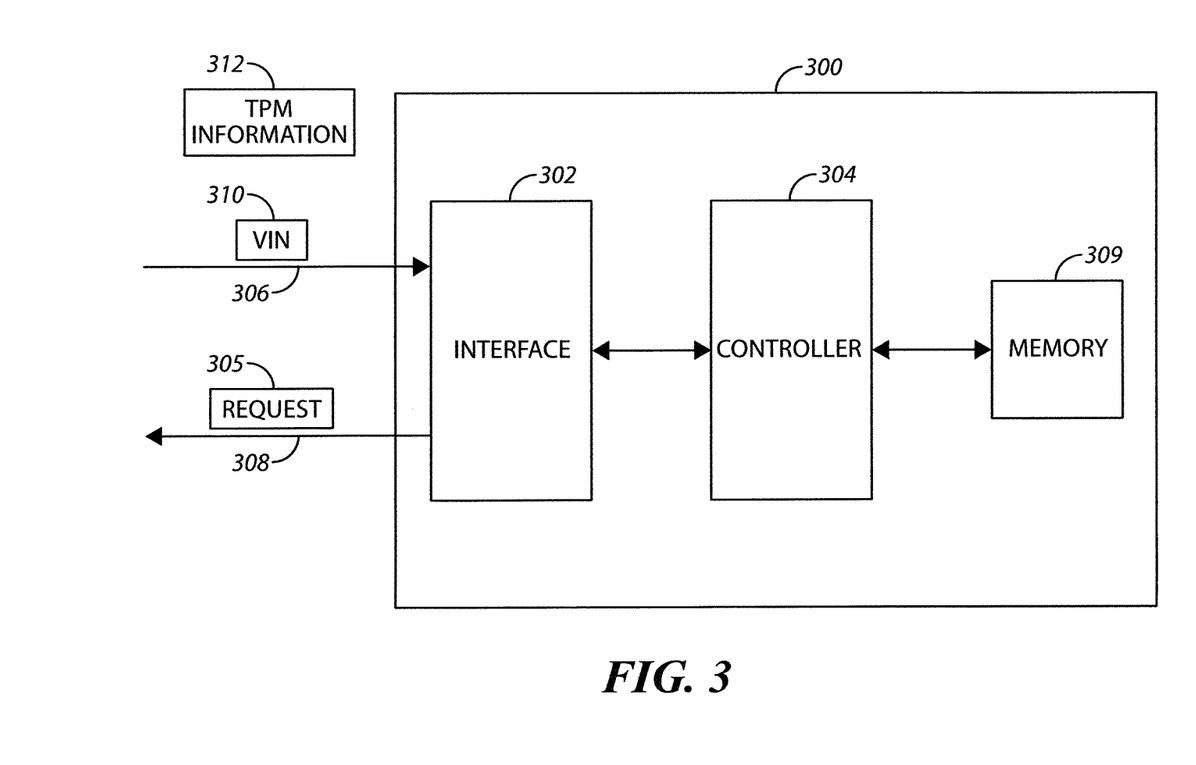
FIG. 3 comprises a block diagram of a multi-function tire pressure check tool according to various embodiments of the present invention.

Referring now to FIG. 3, a portable tool 300 that is configured to obtain data from a tire pressure monitoring (TPM) sensor includes an interface 302 and a controller 304. The interface 302 has an input 306 and an output 308. A memory 309 may be used to store the various types of information as well as the computer instructions used to execute or implement the approaches described herein. The memory 309 may also include tables or other data structures that provide mappings between vehicle identification information and the different tire pressure sensor triggers and parameters used herein. For example, a particular VIN may be associated with a particular LF sensor trigger and a particular RF transmission protocol. Alternatively, the vehicle identification information may be communicated to a central location and the central location may return to the tool the appropriate tire pressure sensing approaches or parameters to use. Such communication may be accomplished using a wireless link for example.

The controller 304 is coupled to the interface 302 and is configured to transmit a request 305 for vehicle identification information 310 at the output 308 and responsively receive the requested vehicle identification information 310 from a vehicle at the input 306. The controller 304 is further configured to, based upon the vehicle information 310, determine one or more tire pressure sensor triggers or parameters. The controller 304 is configured to use the determined one or more tire pressure sensor triggers or parameters to activate singularly or a plurality of tire pressure monitoring (TPM) sensors at the vehicle via the output 308. The controller 304 is further configured to responsively receive tire pressure information 312 at the input 306 from the activated TPM sensors.

It should be understood that any of the devices described herein (e.g., the tools, the controllers, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method for obtaining data from a tire pressure monitoring (TPM) sensor, the TPM sensor disposed at a vehicle wheel, the vehicle having a receiver disposed therein, the receiver being physically separate from the TPM sensor, comprising:
   at a portable tool:
   requesting and receiving vehicle identification information from a label affixed or attached to a vehicle;
   based upon the vehicle identification information, determining one or more tire pressure sensor activation/trigger protocols and one or more Recommended Cold Pressures, the protocols effective to wake the TPM sensor from a sleep state to an active state;

using the determined one or more tire pressure sensor activation/trigger protocols to activate one or more tire pressure monitoring (TPM) sensors at the vehicle;

responsively receiving tire pressure information from the activated TPM sensors;

determining by a controller of the portable tool whether the tire pressure information falls below any of the one or more of the Recommended Cold Pressures;

wherein the tool interacts exclusively with the tire pressure monitor sensor and not the receiver of the vehicle.

2. The method of claim 1 further comprising presenting the tire pressure information to a user via a screen on the portable tool.

3. The method of claim 1 further comprises transmitting the information to a central location.

4. The method of claim 1 wherein the one or more tire pressure sensor activation/trigger protocols are selected from the group consisting of: a low frequency (LF) protocol and a radio frequency (RF) protocol.

5. The method of claim 1 wherein the vehicle identification information comprises a vehicle identification number (VIN).

6. A portable tool that is configured to obtain data from a tire pressure monitoring (TPM) sensor, the TPM sensor disposed at a vehicle wheel, the vehicle having a receiver disposed therein, the receiver being physically separate from the TPM sensor, comprising:

an interface having an input and an output;

a controller coupled to the interface, the controller configured to request vehicle identification information at the output and responsively receive the requested vehicle identification information from a label affixed or attached to a vehicle at the input, the controller configured to, based upon the vehicle identification information, determine one or more tire pressure sensor activation/trigger protocols and one or more Recommended Cold Pressures, the protocols effective to wake the TPM sensor from a sleep state to an active state, the controller configured to use the determined one or more tire pressure sensor activation/trigger protocols to activate one or more tire pressure monitoring (TPM) sensors at the vehicle via the output, the controller configured to responsively receive tire pressure information at the input from the activated TPM sensors, the controller configured to determine whether the tire pressure information falls below any of the one or more of the Recommended Cold Pressures;

wherein the tool interacts exclusively with the tire pressure monitor sensor and not the receiver of the vehicle.

7. The tool of claim 6 further comprising a screen and wherein the controller is configured to present the tire pressure information to a user via the screen on the portable tool.

8. The tool of claim 6 wherein the controller is configured to transmit the information to a central location via the output.

9. The tool of claim 6 wherein the one or more tire pressure sensor activation/trigger protocols are selected from the group consisting of: a low frequency (LF) protocol and a radio frequency (RF) protocol.

10. The tool of claim 6 wherein the vehicle identification information comprises a vehicle identification number (VIN).

11. A computer usable non-transitory medium having a computer readable program code embodied therein, said computer readable program code adapted to be executed to implement a method of obtaining data from a tire pressure monitoring (TPM) sensor, the TPM sensor disposed at a vehicle wheel, the vehicle having a receiver disposed therein, the receiver being physically separate from the TPM sensor, the method comprising:

at a portable tool:

requesting and receiving vehicle identification information from a label affixed or attached to a vehicle;

based upon the vehicle identification information, determining one or more tire pressure sensor activation/trigger protocols and one or more Recommended Cold Pressures;

using the determined one or more tire pressure sensor activation/trigger protocols to activate one or more tire pressure monitoring (TPM) sensors at the vehicle, the protocols effective to wake the TPM sensor from a sleep state to an active state;

responsively receiving tire pressure information from the activated TPM sensors;

determining by a controller of the portable tool whether the tire pressure information falls below any of the one or more of the Recommended Cold Pressures;

wherein the tool interacts exclusively with the tire pressure monitor sensor and not the receiver of the vehicle.

12. The medium of claim 11 further comprising presenting the tire pressure information to a user via a screen on the portable tool.

13. The medium of claim 11 further comprises transmitting the information to a central location.

14. The medium of claim 11 wherein the one or more tire pressure sensor activation/trigger protocols are selected from the group consisting of a low frequency (LF) protocol and a radio frequency (RF) protocol.

15. The medium of claim 11 wherein the vehicle identification information comprises a vehicle identification number (VIN).

* * * * *